United States Patent Office 2,900,829
Patented Aug. 25, 1959

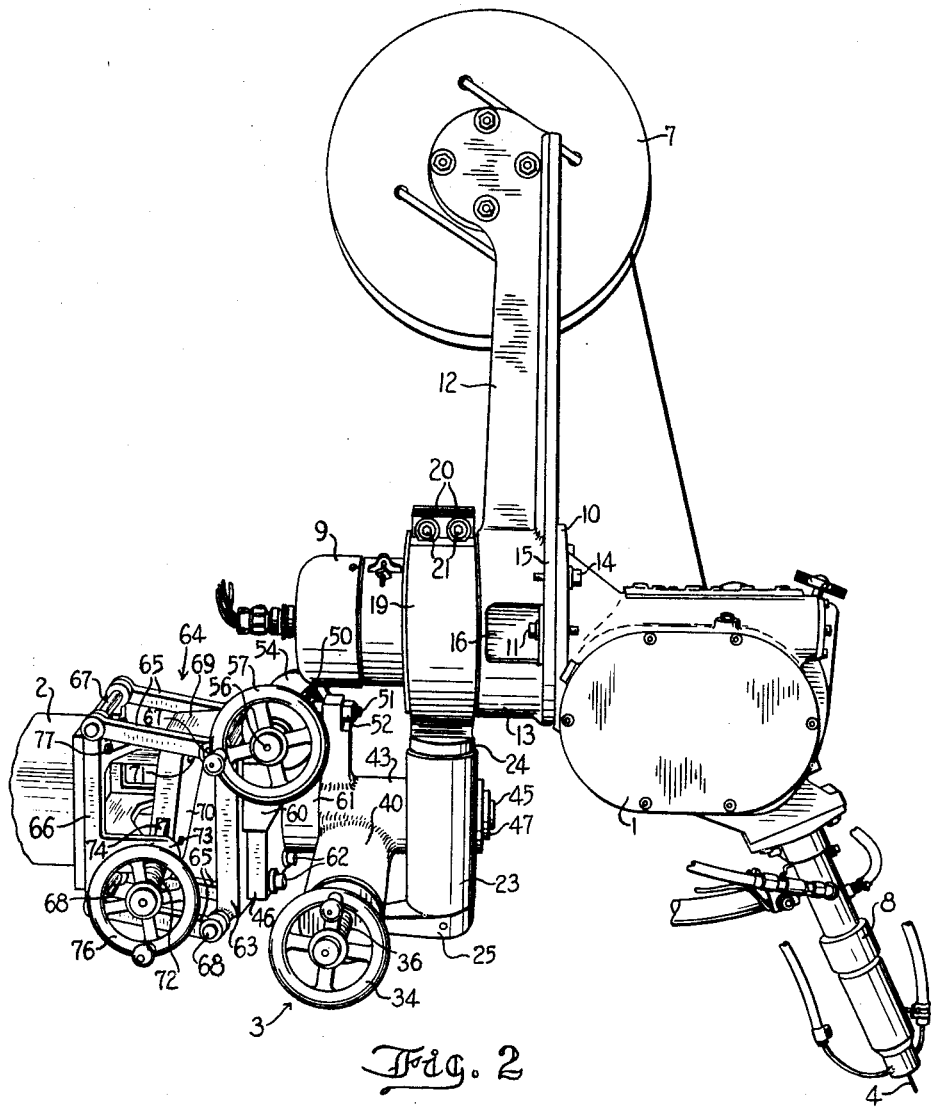

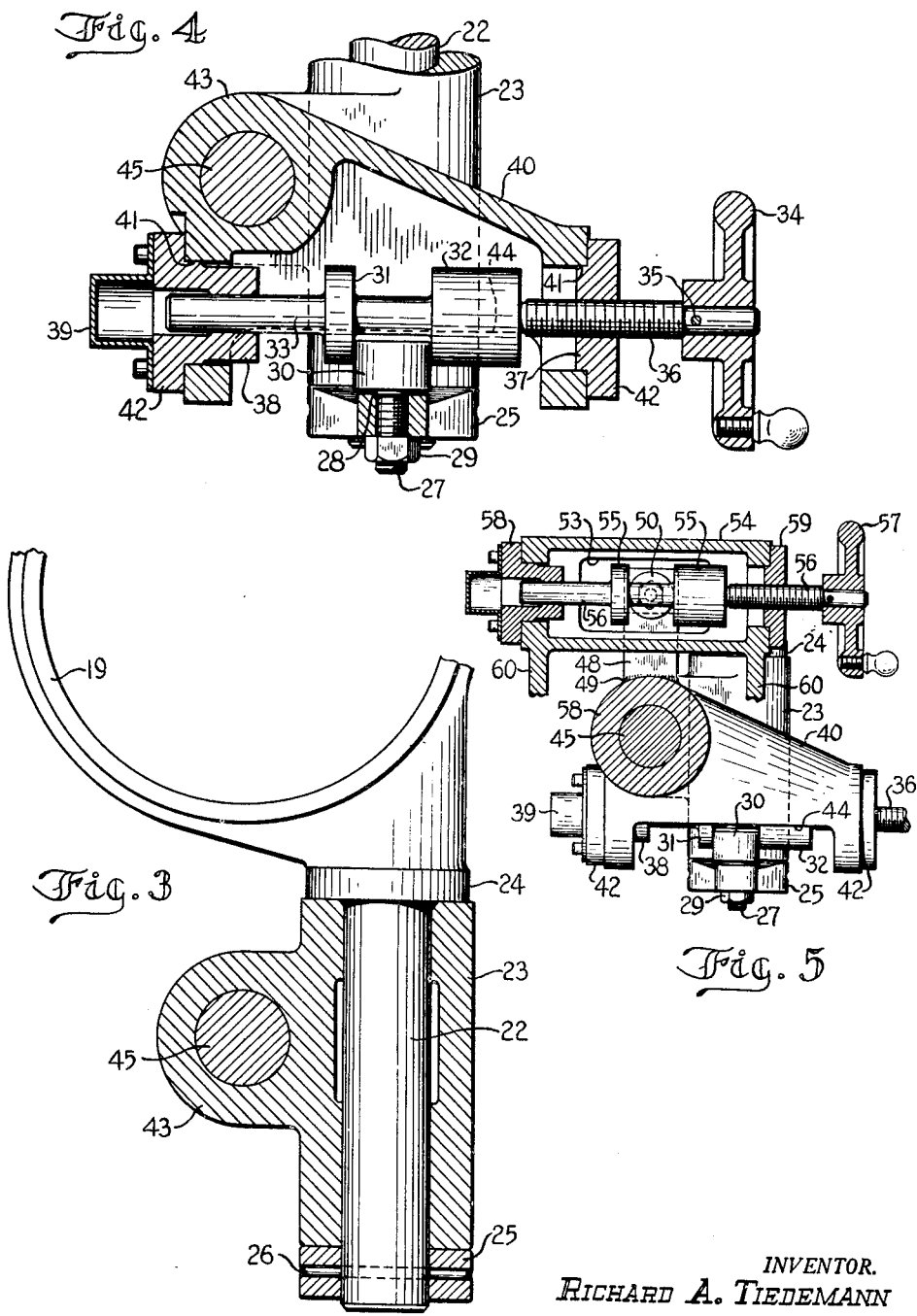

2,900,829

WELDING HEAD POSITIONER

Richard A. Tiedemann, Milwaukee, Wis., assignor to A. O. Smith Corporation, Milwaukee, Wis., a corporation of New York Application October 8, 1956, Serial No. 614,723

8 Claims. (Cl. 74—89)

This invention relates to a welding head positioner and particularly to a positioner for fine adjustment of the welding head position.

In the art of automatic arc welding, it is desirable to angularly position the electrode with respect to the joint to be welded. For example, in making a fillet weld, it is generally necessary to position the electrode at an angle to a vertical plane passing through a line parallel to the weld. Further, it is often desirable to position the electrode at an angle to a vertical plane passing through a line perpendicular to the weld.

Moreover, with the increased use of arc welding, there is a demand for a welding head which is easily and accurately adjusted so as to be readily adapted for use in arc welding for a variety of initial production arrangements as well as for subsequent changes required in any particular production arrangement.

The present invention provides a universally positionable welding head support having improved means for moving the weld head and thereby disposing the end of the electrode with respect to the work. A protective shield is provided about the positioning actuating mechanism to prevent clogging by dirt and the like in the atmosphere surrounding the moving mechanism.

The accompanying drawings illustrate the best mode presently contemplated by the inventor for carrying out the invention.

In the drawings:

Fig. 2 is a perspective view from the opposite side of the head and positioner;

Fig. 3 is a fragmentary sectional view taken on a vertical plane through the welding head mounting means, viewed to the left in Figure 1 and to the right in Fig. 2;

Fig. 4 is a fragmentary sectional view taken on a vertical plane through the horizontal actuating mechanism, viewed to the left in Figure 1 and to the right in Fig. 2; and Fig. 5 is a fregmentary sectional view similar to Fig. 4 taken on a vertical plane through the vertical actuating mechanism.

Figure 1:
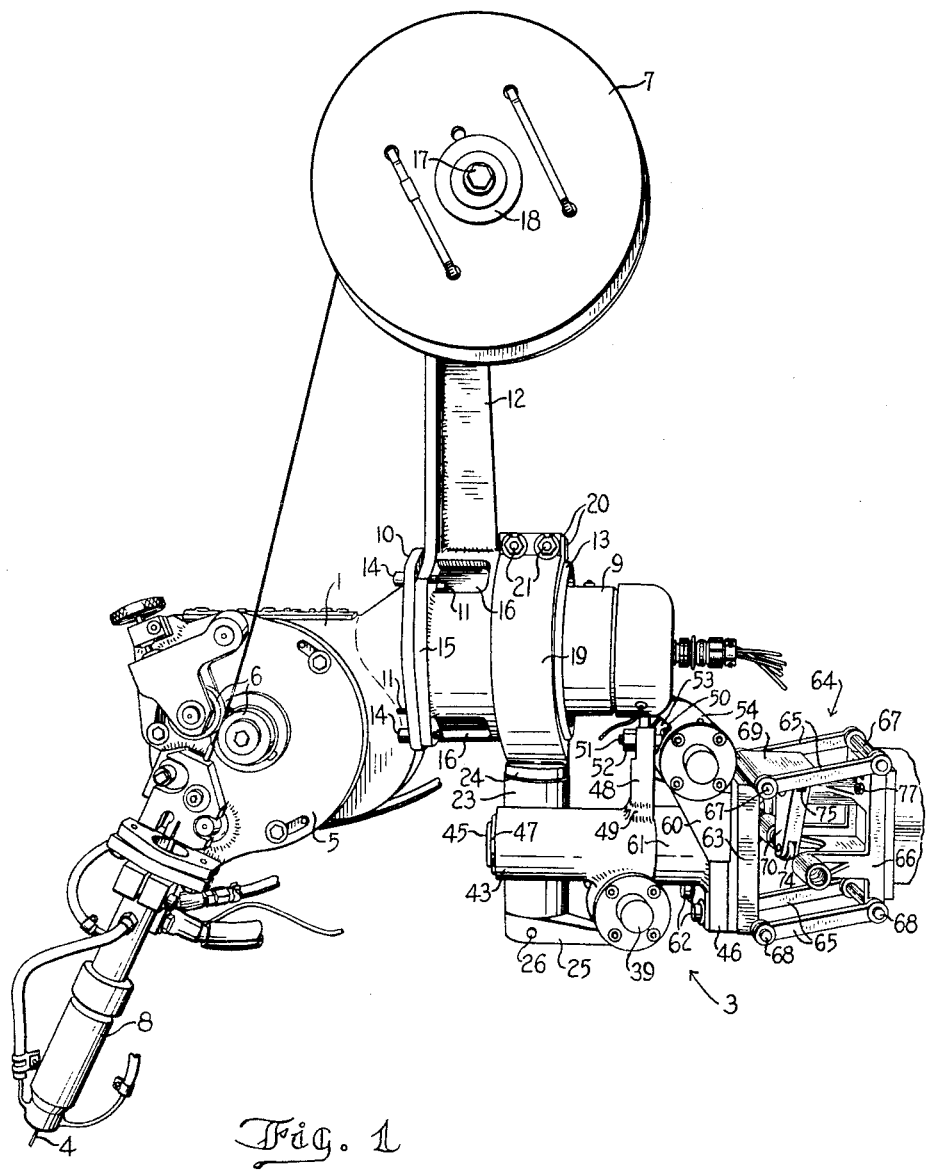
Figure 1 is a perspective view of a welding head connected to a positioner.

Referring to the drawings, and particularly to Figures 1 and 2, a welding head 1 is secured to the end of a boom 2 by a weld head positioner or manipulator 3 to permit the movement and placement of an electrode 4.

The welding head 1 comprises, in general, an electrode drive and straightening plate 5 having drive rolls 6 which unwind the wire electrode from a reel 7 and push it through a nozzle 8. The drive rolls 6 are connected by a gear system, not shown, to a motor 9 which is supported on a flange 10 of the head as by bolts 11.

The electrode reel 7 is rotatably secured to the end of an arm 12 which extends outwardly from the welding head. The arm 12 terminates immediately adjacent the head in a tube member 13 which encircles the motor 9 and which is secured to the welding head flange 10 by a plurality of bolts 14 extending through flange 10 into suitably tapped holes in a flange 15 of the tube member 13. Suitable openings 16 are provided in the periphery of the member 13 to allow access to the motor support bolts 11. The reel 7 is rotatably disposed upon a stationary shaft, not shown, which extends laterally from the free end of arm 12 and provides a bearing surface for the reel 7. A bolt 17 threads into the end of the shaft and maintains a washer 18 adjacent the outer face of the reel 7 to hold the reel on the shaft as shown in Figure 1.

The head 1 is secured to the positioner 3 by a C-clamp 19 which encircles the back portion of the tube member 13. The clamp 19 is provided with a pair of opposed lips 20 and a pair of set screws 21 extend through one of the lips and thread into aligned and tapped openings in the opposite lip. The C-clamp permits relatively large and rapid rotation of the head 1 about the longitudinal axis of the motor 9.

To allow fine adjustment of the position of the electrode 4, the positioner 3 is adapted to rotate the welding head about two perpendicular axes and to vertically move the head, as more fully described hereinafter.

In the illustrated embodiment of the invention, rotation of the welding head in a generally horizontal plane in Figures 1 and 2 and therefore about an axis perpendicular to the axis of the C-clamp is provided for by a mounting shaft 22 which depends from the clamp 19 diametrically opposite the lips 20. The shaft 22 is journaled within a relatively stationary cylinder 23, and, as more clearly shown in Fig. 3, an annular flange 24 is integrally formed with the shaft 22 immediately adjacent the C-clamp 19 to provide a bearing support surface resting on the upper end surface of the cylinder 23. The lower end of the shaft 22 protrudes slightly from the cylinder 23 and has fixed thereto a control arm 25 by a pin 26 which extends through aligned lateral openings in the arm 25 and the shaft 22.

The control arm 25 is generally flat and teardrop in shape and has an aperture in the enlarged end thereof through which the shaft 22 passes.

Referring to Figs. 4 and 5, the opposite or more pointed end of arm 25 is apertured to receive a threaded shaft 27 which extends laterally therethrough. The shaft 27 is secured to the arm 25 by a clamping shoulder 28 immediately adjacent one surface of the arm and a nut 29 threaded on the opposite end of the shaft 27. The end of the shaft adjacent the shoulder 28 carries a rotatable roller cam 30 to which a moving force is applied to pivot the arm 25 about the axis of the cylinder and to thereby rotate the shaft 22 and attached welding head in a horizontal plane.

Referring to Fig. 4, in particular, the roller cam 30 is disposed between a pair of axially spaced collars 31 and 32 which are integrally formed with the central portion of a movable shaft 33 which moves longitudinally and perpendicular to the axis of the shaft 22 and cylinder 23. The cam 30 follows the longitudinal movement of the collars and consequently turns the arm 25 and attached shaft 22 about the axis of the cylinder 23.

The longitudinal movement of the control shaft 33 is manually controlled by a handwheel 34 secured to one end of the shaft as by a pin 35. The portion of the shaft 33 between the handwheel 34 and the nearest collar 32 is threaded as at 36 and threads through a relatively stationary member 37 having a correspondingly threaded central aperture.

The opposite end of the shaft 33 is slidably journaled in a bearing member 38. A cup-shaped cap 39 is secured to the exterior surface of the member 38 to seal the bearing from the surrounding atmosphere and still allow longitudinal movement of the shaft through the bearing member. The stationary end member 37 and the bearing member 38 are removably press fitted within end openings in a generally tubular protective enclosure 40. The end openings in the enclosure 40 have the same bore and the bearing members 37 and 38 are each provided with an inner extending bearing hub 41 which is press fitted into the openings. A flange 42 is provided on each end member 37 and 38 to position the members in the openings.

The bearing members 37 and 38 are interchangeable such that the shaft 33 and handwheel 34 may be inserted from the opposite end of the enclosure 40 to allow the adjustment of the position of the weld head from the opposite side. The bores of the end openings of the enclosure 40 are sufficiently large to allow the collars 31 and 32 to pass therethrough when assemblying the shaft 33 with the bearing members 37 and 38.

The protective enclosure 40 is a generally tubular member which is secured to the exterior surface of a rotatable cylinder 43 and which encircles the shaft 33 and the collars 31 and 32. A bottom opening 44 is provided in the periphery of the cylindrical enclosure 40 through which the cam 30 extends into operative relation with the collars. The opening 44 is sufficiently long to allow complete movement of the cam as the shaft is threaded between the limits of the bearing members 37 and 38.

As shown in Figures 1, 2 and 5, a similar vertical plane positioning structure is also provided to effect rotation of the head 1 about an axis at ninety degrees to the shaft 22 and the cylinder 23. Referring to Figures 1 and 2, this structure comprises the second cylinder 43 disposed at ninety degrees to the first cylinder 23 and integrally cast or otherwise secured together with the exterior surface of the first cylinder 23 and the enclosure 40. Therefore, rotation of the cylinder 43 rotates the attached cylinder 23 and enclosure 40 with the attached welding head about the axis of the cylinder 43. A relatively stationary support shaft 45 extends from a plate 46 and is journaled in the cylinder to provide a bearing surface for rotation of the cylinder 43. A snap ring 47 fits in a groove in the shaft which extends through the cylinder 43 and holds the cylinder 43 on the shaft 45, as shown in Figure 1.

The rotation of the cylinder is effected by an arm 48 which is welded as by weld 49 or otherwise secured to the cylinder 43 and extends radially outwardly from the cylinder to provide a control lever. A roller cam 50 is secured to the outer end of the arm 48 and is rotatably mounted on a threaded bolt 51 which extends transversely through the free end of the arm. A nut 52 threads onto the bolt 51 and clamps the bolt to the arm. As most clearly shown in Fig. 5, the cam 50 is extended through an opening 53 in a protective enclosure 54, similar to the enclosure 40, and is disposed between a pair of collars 55 which are carried by a shaft 56. A handwheel 57 is pinned to one end of the shaft 56 and manually manipulated to longitudinally move the shaft 56 through bearing members 58 and 59 secured in the ends of the enclosure 54. The movement of shaft 56 in turn effects rotational movement of the arm 48 and the attached cylinder 43 about the axis of shaft 45.

The bearing members 58 and 59 are also interchangeable to allow reversal of the shaft 56 and handwheel 57 in the same manner as previously described for shaft 33 and handwheel 34.

The enclosure 54 is secured to the plate 46 by a pair of depending flanges 60 which extend from the opposite ends of the enclosure 54 and which are secured to the side edges of the plate 46 in any suitable manner.

The plate 46 is also provided with a hub 61 of the same diameter as the cylinder 43 and through which the shaft 45 also extends. The hub 61 maintains the cylinder 43 in suitably spaced relation to the plate 46 to dispose the cam 50 within the enclosure 54.

The plate 46 is bolted by a plurality of through bolts 62 of which only the lower bolts are shown in Fig. 2 to a generally vertical moving plate 63 which is a part of a parallelogram structure designated generally by the number 64.

The parallelogram structure is employed to move the welding head in a generally vertical direction and is claimed and more fully described in applicant's copending application assigned to a common assignee with the present invention. The copending application is entitled, "Weld Head Positioning Apparatus," Serial No. 614,724 filed on October 8, 1956.

In general, the parallelogram structure comprises four arms 65 disposed to form a parallelogram with the arms pivotally attached at one end to a mounting bracket 66 and at the opposite end to the movable plate 63. The arms are secured at each end on upper pins 67 and lower pins 68 by suitable lock washers or the like. A flange 69 extends rearwardly from the upper edge of the movable plate 63 and is engaged by a pivotal cam 70. The cam is generally triangularly shaped and is pivotally supported at an apex on a shaft 71. The pivotal movement of the cam is controlled by a longitudinally movable shaft 72, shown in Fig. 2, which threads through an embossment 73 and engages a roller 74 mounted within a bifurcated second apex of the cam and pivots the cam about the shaft. A roller 75, partly shown in Figure 1, is mounted within a bifurcated third cam apex and engages the undersurface of the flange 69 to support the flange and the attached plate 63. Therefore, as the cam 70 is pivoted about the shaft 71, it raises and lowers the plate 63. A handwheel 76 is secured to the end of shaft 72 to permit manual control of the shaft.

The parallelogram structure 64 is secured to the end of the boom 2 by a plurality of spaced bolts 77 which extend through suitable openings in the bracket and thread into tapped openings, not shown, in the end of the boom.

The boom 2, of which only the terminal end is shown, is normally adapted to be rotated about a central point and also to be moved in a vertical direction to allow relatively large movement of the weld head to any of a number of general work areas.

The present invention provides a rugged and accurate positioning means for an arc welding head. The positioning is easily operated and protected from undue clogging with foreign matter.

Various modes of carrying out the invention are contemplated as being within the scope of the following claims particularly pointing out and distinctly claiming the subject matter which is regarded as the invention.

I claim:

1. In a welding head positioner to selectively angularly locate a welding head a base support means for said welding head, a rotatable member connected with the welding head, a bearing member for said rotatable member secured to said base support means, an arm connected to the rotatable member and extending laterally therefrom, and a longitudinally moving rod journaled within said base support means and having means adapted to engage the free terminal end of the arm and to pivot the arm about the axis of the member to thereby rotate the member and the attached head incident to longitudinal movement of the rod.

2. In a welding head positioner to selectively angularly locate a welding head a base support means for said welding head, a rotatable member connected with the welding head, a bearing member for said rotatable member secured to said base support means, an arm connected to the rotatable member and extending laterally therefrom, and a longitudinally moving rod journaled within said base support means and having means adapted to engage the free terminal end of the arm and to pivot the arm about the axis of the member to thereby rotate the rotatable member and the attached head, and an upper protective enclosure on said base support means disposed about the rod to protect said means and arm from descending foreign matter adjacent the weld head.

3. In a welding head positioner, a rotatable shaft adapted to support the welding head, an arm connected to the shaft and extending laterally from the arm, a roller secured to the end of the arm, a longitudinally movable rod disposed substantially transversely of said arm, and a pair of spaced collars thereon adapted to receive the roller and to pivot the arm about the axis of the shaft to thereby rotate the shaft and the attached head.

4. A weld head positioner, which comprises a first hollow cylinder, a second hollow cylinder secured directly to the first named cylinder with their axis disposed at ninety degrees, a first shaft journaled in said first named cylinder, means to secure the first shaft to a stationary support member, means secured to the first named cylinder to pivot the first cylinder and the second cylinder as a unit about the first shaft, a second shaft journaled within the second cylinder, mounting means for the weld head secured to the second shaft, and means attached to the second shaft to pivot the second shaft.

5. A weld head positioner according to claim 4 wherein the means to pivot the first cylinder and the means to pivot the second shaft each comprise an arm extending radially from the respectively pivoted cylinder and shaft, a bearing member secured to the end of the arm, a transversely moving rod disposed adjacent said bearing member, a pair of collars secured in axially spaced relation on said shaft to either side of the bearing member whereby the bearing member follows the movement of said collars, and means to move the shaft in a longitudinal direction.

6. Actuating apparatus for a pivotal control arm in a weld head positioner, which comprises a protective enclosure having opposed end members and having a longitudinal opening through which a free end of the control arm extends into the enclosure, one of said end members having a threaded opening, the other of said end members having a bearing opening, a shaft having an intermediate threaded portion adapted to be threaded through said threaded member and a smooth bearing end adapted to be journaled within said bearing opening, and a pair of axially spaced collars secured to the shaft between said bearing portion and said threaded portion and adapted to receive the free end of the control arm whereby the control arm is pivoted in response to longitudinal movement of the shaft.

7. Apparatus according to claim 6 wherein a roller is secured to the free end of the control arm and is disposed between the collars.

8. Apparatus according to claim 6 wherein said end members are removably secured to the enclosure and interchangeable to adapt the apparatus to selectively control the pivoting of the control arm from either side of the weld head positioner.

References Cited in the file of this patent
UNITED STATES PATENTS

| | | |
|---|---|---|
| 1,387,101 | Candee | Aug. 9, 1921 |
| 1,387,622 | Simmons et al. | Aug. 16, 1921 |
| 1,948,763 | Koch | Feb. 27, 1934 |
| 2,154,080 | Zimmerman | Apr. 11, 1939 |
| 2,209,893 | Schreeck | July 30, 1940 |
| 2,494,698 | Forrest | Jan. 17, 1950 |
| 2,715,839 | Springer | Aug. 23, 1955 |